United States Patent [19]

Reed

[11] Patent Number: 4,807,808
[45] Date of Patent: Feb. 28, 1989

[54] REUSEABLE CONTAINER

[76] Inventor: Harold F. Reed, 2611 Plaza Pkwy. #102, Wichita Falls, Tex. 76308

[21] Appl. No.: 108,742

[22] Filed: Oct. 15, 1987

[51] Int. Cl.⁴ .............................................. B65D 11/16
[52] U.S. Cl. ................................... 229/103; 229/122; 229/41 R; 220/4 R
[58] Field of Search ..................... 229/103, 122, 49 R; 220/4 R, 4 F

[56] References Cited

U.S. PATENT DOCUMENTS

| 3,974,934 | 8/1976 | Rohner | 220/4 F |
| 4,595,137 | 6/1986 | Kupersmit | 229/41 R |
| 4,624,380 | 11/1986 | Wernette | 229/41 R |

Primary Examiner—Willis Little

[57] ABSTRACT

An interlocking multi-pieced shipping container with removable sides and ends to aid in unpacking with a secondary utilization of a storage box, pet house or childrens play house.

3 Claims, 1 Drawing Sheet

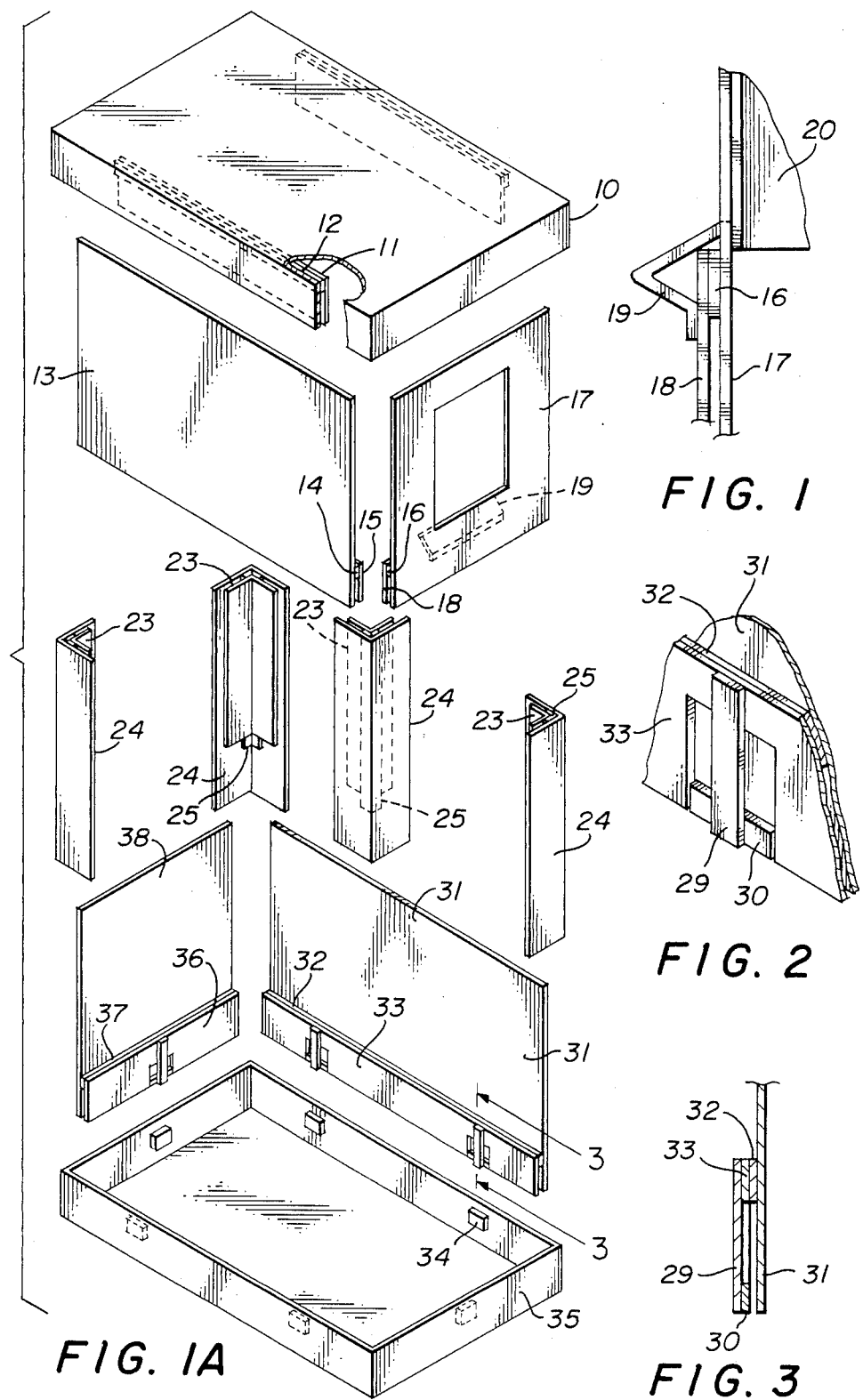

REUSEABLE CONTAINER

FIELD OF THE INVENTION

The invention relates, in general, to a shipping container and, more particularly, to a unique application as a pet house or storage box.

BACKGROUND OF INVENTION AND PRIOR ART

Presently, many container designs are manufactured for product shipment that become waste materials. Today's ecology demands a more environmental approach toward such waste. A secondary utilization of these containers for appliances, such as microwave ovens, washers, dryers, top loading food freezers or etc., is they can be stenciled decorated to become pet houses or children play houses. Shipping containers of smaller size can become storage containers. They are substantial enough to be used for many years.

The design of this container provides for easy disassemble of the sides and ends to remove heavier products, thus, making lifting and removal safer and easier. Many of today's containers make product removal difficult and hazardous to ones fingers and back.

SUMMARY OF THE DRAWINGS

FIG. 1A is an exploded view of the reuseable container.

FIG. 1.-shows the pet threshold, door and retaining mechanism.

FIG. 2.-shows the retaining mechanism and the side locking tabs.

FIG. 3.-is a cross section of the retaining mechanism and locking tabs.

PREFERRED CONSTRUCTION

The material is corrugated cardboard, skinned on both sides or other suitable materials. The base section 35 is to be sized for the particular item to be packaged and shipped, taking into consideration extra space for packing to be used to insulate the item for physical shock during shipment. Once the parameter of the base section 35 has been established the sides 13, 17, 31 and 38 can be determined. The horizontal dimensions will be controlled by the base section 35 with considerations for the corner supports 24 and 25. The vertical dimensions of 13, 17, 31 and 38 will be controlled by the item being shipped, packing to be used and shock supports to be used. The corner supports 23, 24 and 25 consist of a three (3) ply construction with the length dimension of spacer 24 equal to the heighth dimension of sides 13, 17, 31 and 38. The length of support 23 and spacer 25 are less the heighth of the base section vertical sides of base 35 with spacer 25 longer to the width of spacer 32. Four of these assemblies are required.

The top 10 is larger than the base 35 by the dimension of the thickness of sides 13, 17, 31 and 38 and corner 24 on each corner. The length of the turned down flange should be equal to the turned up flanges of base 35. The inside guide 11 and spacer 12 are to support top 10. The length of guide 11 and spacer 12 are as long as top 10 less the width of corner 24 on each corner.

The length of supports 18 and 36 are the same as the width of ends 17 and 38 respectively. The heighth of 18 and 36 are equal to the heigth of the flange turned up on base 35 plus the heighth of spacers 16 and 37. Spacers 14, 16, 32 and 37 are to be 25% of the heighth of the vertical flange of base 35.

The locking of the sides 13, 31 and 38 to the base 35 is shown in FIG. 2. The clearance in support 33 is to clear boss 34 which is bonded to base 35. Arm 29 is bonded to support 33 and cleat 30 is bonded to arm 29. Note cleat 30 clears opening in 33 and the width is to be determined by the locations of boss 34 from the bottom of base 35 shown in FIG. 3.

End 17 incorporates a typical door for pet house with a spacer 16 inside support 18 and a threshold 19 folded inside and bonded to support 18 (FIG. 1). Door 20 is to be larger than door opening in end 17 and bonded in place for a secured side as a shipping container. Corners 24 (four required) are folded 90 degrees with spacer 25 and inside support 23 bonded together with contact cement or other good adhesive material.

After the product is enclosed inside the container, plastic or metal banding can be used to support the container and product during transport.

I claim:

1. An interlocking reuseable container with removable sides to facilitate unpacking, comprising in combination: a base having a bottom and an upturned peripheral flange delineating positions for the sides; bosses secured at spaced apart locations on the interior of the flange above the bottom; a plurality of removable sides each having receiving means for receiving portions of the flange; at least some of said receiving means interlocking with said bosses; and, a plurality of corner supports each comprising an outside elongated substantially right angle corner, an elongated spacer bonded to the interior of the corner to cover a narrow central portion thereof, and an elongated inside support bonded to the spacer to leave substantially right angle spaces between the corner support and the inside support for receiving edges of adjacent sides there by comprising a substantially rigid container.

2. The container of claim 1 further comprising: a top having an upper surface and a downturned peripheral flange similar to the base but being larger by the thickness of the sides; and, a plurality of receiving means bonded to the interior of the top adjacent the downturned flange thereof and depending from the top in spaced relation to the downturned flange to receive selected sides of the container.

3. The container of claim 2 further comprising a door in one of said sides.

* * * * *